(12) United States Patent
Ainsworth et al.

(10) Patent No.: US 6,366,958 B1
(45) Date of Patent: Apr. 2, 2002

(54) NETBIOS PROTOCOL SUPPORT FOR A DCE RPC MECHANISM

(75) Inventors: Spencer James Ainsworth, Round Rock; Richard Tsun-hsiung Wang, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/734,764

(22) Filed: Oct. 21, 1996

(51) Int. Cl.$^7$ ............................................... G06F 13/00
(52) U.S. Cl. ........................ 709/230; 709/330; 709/328
(58) Field of Search ................................ 709/230, 300, 709/302, 303, 100, 101, 102, 103, 105, 225, 228, 229, 250, 328, 329, 330

(56) References Cited

U.S. PATENT DOCUMENTS

| | | | |
|---|---|---|---|
| 5,224,098 A | | 6/1993 | Bird et al. |
| 5,265,239 A | | 11/1993 | Ardolino |
| 5,367,643 A | | 11/1994 | Chang et al. |
| 5,491,693 A | * | 2/1996 | Britton et al. ............... 370/401 |
| 5,526,483 A | | 6/1996 | Frech et al. |
| 5,537,417 A | * | 7/1996 | Sharma et al. ............... 709/228 |

OTHER PUBLICATIONS

Anand, et al., "Reduction of NetBIOS Storms Caused by Group Name Directory," IBM Technical Disclosure Bulletin, vol. 38, No. 7, Jul. 1995, pp. 409–410.

Cheng, et al., "Transmission Control Protocol/Internet Protocol Networking Over NetBIOS," IBM Technical Disclosure Bulletin, vol. 36, No. 2, Dec. 1993, pp. 619–624.

Hunt, G.T., "Support More Than 254 Sessions With RFC 1001/1002/TCP/IP," IBM DOSS, Oct. 31, 1995.

* cited by examiner

Primary Examiner—Majid A. Banankhah
(74) Attorney, Agent, or Firm—Jeffrey S. LaBaw; Joseph R. Burwell; David Judson

(57) ABSTRACT

A DCE RPC mechanism normally uses a TCP/IP-based transport service to enable client machines to make remote procedure calls to server machines in a distributed computing environment. NETBIOS protocol support for the RPC mechanism is provided by using NETBIOS application names similar to TCP/IP conventions and through use of connection-oriented or connection-less NETBIOS protocol sequences. In particular, NETBIOS names are used as though they include a fixed portion representing a machine, and a dynamic portion representing an application on that machine. New functions are provided to use NETBIOS names in place of TCP/IP addresses and these NETBIOS names are then used via the sockets API, leaving RPC's use of the sockets API unchanged.

20 Claims, 4 Drawing Sheets

NETBIOS PROTOCOL SUPPORT FOR A DCE RPC MECHANISM

TECHNICAL FIELD

The present invention relates generally to computer communications and, more particularly, to adding NETBIOS protocol support in a known DCE RPC implementation.

BACKGROUND OF THE INVENTION

A local area network (LAN) provides a distributed computing environment in which users can access distributed resources and process applications on multiple computers. Network communications are carried out using so-called communication protocols. By convention, communication architectures in a local area network are typically characterized as conforming to a seven layer model in the following hierarchy: physical layer, logical link layer, network layer, transport layer, session layer, presentation layer and application layer. The physical layer comprises the actual physical devices and medium used to transmit information. The logical link layer frames data packets and controls physical layer data flow, insuring delivery of data regardless of the actual physical medium. The network layer addresses and routes data packets. It creates and maintains a route in the network between a source node and a destination node. The transport layer creates a transport pipeline between nodes and manages the network layer connections. The session layer typically provides remote procedure call (RPC) support, maintains the integrity of the connection between nodes and controls data exchange. The presentation layer encodes and decodes data and provides transparency between nodes. Finally, the application layer provides the interface to end-user processes and provides standardized services to applications.

The seven layer model has many variations depending on the particular network architecture. Thus, for example, in a network architecture based on the TCP/IP (Transmission Control Protocol/Internet Protocol) interface running IBM RISC System/6000® computer workstations under the AIX Operating System, there is another layer, called the socket layer, that sits between the session and transport layers. The socket layer creates so-called "sockets" which are logical constructs analogous to physical ports. In this architecture, the RPC mechanism is not just supported in the session layer, but also includes functionality of the session layer. A known RPC mechanism useful in distributed computing environments (DCE) includes software code provided by the Open Systems Foundation (OSF).

The OSF DCE RPC mechanism is used conventionally to manage communication between a "client" and a "server" in a distributed computing environment, with the client requesting a service from a server using a remote procedure call (RPC). A "client" refers to a network participant that is requesting a service accessible somewhere within the computing environment. A "server" provides the requested service to a client. With the OSF DCE RPC mechanism, each client process (e.g., a process running on a client machine) has an associated socket created by the socket layer. Each server process likewise is associated with a socket. In response to an RPC, a call directory service returns a data structure, called a "binding handle," specifying the location of the server process as a network address and the port number where the server process is running. The binding handle is then used by the RPC mechanism to define a communication path between the client process and the server process. The path is defined typically using ip-based (i.e., network layer) protocol sequences of the Internet Network Address Family (AF_INET) to open the sockets.

Local area network managers are becoming more varied, consisting of different LAN technologies, multiple vendors and multiple adapters. There is also a higher performance requirement and a greater need for an increased number of connections to servers and to network management. In the prior art, it is also known to support a number of protocol "stacks" on a particular machine to enable support of multiple network protocols. Thus, for example, a machine may support a NETBIOS (NETwork Basic Input/Output System) stack, a TCP/IP (Transmission Control Protocol/Internet Protocol) stack, and other stacks (such as SNA, OSI/CS, and the like). TCP/IP may include an application programming interface layer, called TCPBEUI (which was developed by and available from IBM), for converting NETBIOS programming interface calls to sockets.

As companies move more of their applications to the client/server environment, they desire to access servers from hundreds of computers, some of which use TCP/IP and some of which use NETBIOS. As noted above, current DCE RPC implementations (such as in OS/2) use a sockets API that supports TCP/IP addressing and protocols. Machines running NETBIOS do not have TCP/IP capability and thus are not able to take advantage of DCE RPC services. While use of multiple protocol stacks is a possible solution, system administrators generally do not want to administer a TCP/IP network as well as a NETBIOS network.

It would therefore be desirable to add NETBIOS protocol support to an existing TCP/IP-based DCE RPC mechanism.

BRIEF SUMMARY OF THE INVENTION

It is thus a primary object of the present invention to support the NETBIOS protocol in DCE RPC.

It is a more general object of the invention to enable a NETBIOS-based client to access and use DCE services in a network without requiring that the network be administered under TCP/IP. Preferably, the addressing scheme and protocol sequences are NETBIOS-based, such that there is no need for a TCP/IP protocol stack in the client or use of TCP/IP protocol sequences on the network.

It is another object of the invention to facilitate native NETBIOS protocol support in DCE RPC without requiring changes to RPC application programming interfaces (API's). In "native" NETBIOS, the particular addressing scheme and protocol sequences are NETBIOS-based.

It is still another object to enable current NETBIOS-based LAN server systems to upgrade without having to add TCP/IP protocol support or to use a TCP/IP protocol stack.

Still another more general object of the invention is to simplify the administration of local area networks by implementing NETBIOS protocol support for DCE RPC without requiring administration of a TCP/IP protocol support and TCP/IP addresses.

Yet another object of the invention is to enable DCE RPC to configure and manage NETBIOS naming conventions.

It is another object of the invention is to eliminate TCP/IP address administration in a DCE implementation using NETBIOS.

Further, it is another more specific object of the invention to implement "native" NETBIOS in DCE with a minimum amount of NETBIOS name administration. NETBIOS hostnames are preferably obtained automatically from a Multi-protocol Transport Networking Service (MPTS) or from the RPC mechanism.

These and other objects of the invention are achieved in a distributed computing environment wherein client machines normally issue remote procedure calls (RPC's) to server machines over a network using a transport mechanism specified by an application programming interface (API), a first addressing scheme and a first protocol. A preferred method of the invention then begins by configuring a set of application addresses in accordance with a second addressing scheme associated with a second protocol. In response to an RPC issued by a client machine, an application address from the set of application addresses is obtained. Thereafter, the application programming interface of the transport mechanism and the second protocol are used to execute the RPC to a server machine identified by the application address.

In the preferred embodiment, the API of the transport mechanism is sockets and the first protocol is TCP/IP, and the second protocol is NETBIOS. The RPC may be executed using a NETBIOS connection-oriented protocol sequence, or by using a NETBIOS connection-less protocol sequence.

The step of configuring the set of application addresses includes the steps of generating a hostname to represent each server machine in the network that supports NETBIOS applications, and assigning the hostname to a first fixed portion of an application address. The hostname may be automatically generated by a multiprotocol transport service, or it may be generated in some other fashion. In addition to the first fixed portion, the application address has a second variable portion, and the step of configuring the set of application addresses also generates a port number for each NETBIOS application supported on the server machine. The port number may be generated on an as-needed basis by an endpoint mapper to resolve dynamic endpoints.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
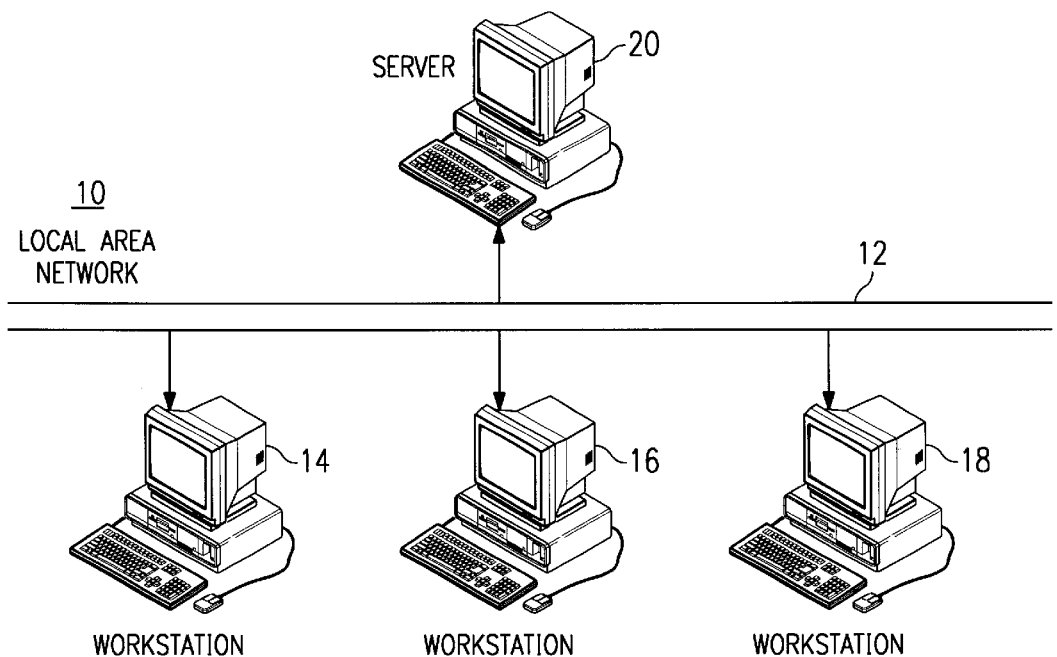
FIG. 1 illustrates a computer network in which the present invention is implemented.

Referring now to the drawings, and more particularly FIG. 1, there is shown a typical local area network (LAN) 10 comprising a common cabling system 12 to which a plurality of workstations 14, 16 and 18 are connected. A local area network provides a distributed computing environment in which users can access distributed resources and process applications on multiple computers. Network communications are carried out using so-called communication protocols. It is understood by those of ordinary skill in the art that the workstations are equipped with a physical adapter card and that the cabling system may have a bus or ring topology and be implemented as a coaxial cable, twisted pair, fiber optic cable or any other supported communications media. Moreover, the several workstations need not be physically identical and may have differing features.

Each of the workstations is a computer. For example, each computer may be an IBM® or IBM-compatible computer running under the OS/2® operating system. For more information on the OS/2® operating system, the reader is directed to *OS/2® 2.0 Technical Library, Programming Guide* Volumes 1–3 Version 2.00, Order Nos. 10G6261, 10G6495 and 10G6494. While the invention will be described in terms of this hardware and software, one skilled in the art will recognize that other operating systems and hardware can be supported without undue experimentation. Also resident on the computer system may be a network operating system software for controlling LAN communications. Each of the workstations may function as a client or a server. A particular client and server communicate over the network during a state referred to as a "session."

Figure 2:
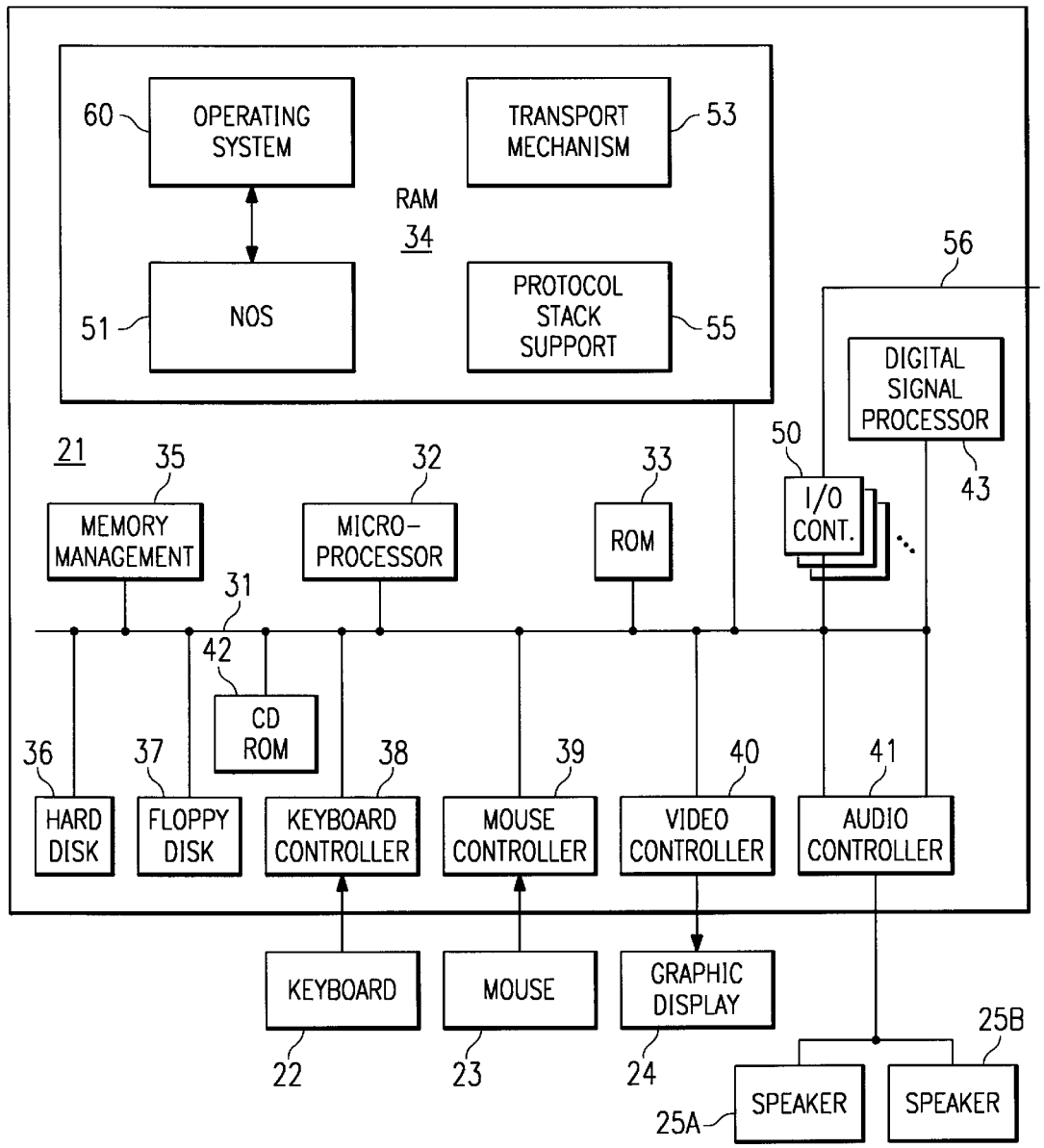
FIG. 2 illustrates a representative personal computer or "workstation" of FIG. 1 which forms part of the LAN.

FIG. 2 shows a block diagram of the components of one of the computers shown in FIG. 1. As will be discussed below, is will be assumed that the computer supports a NETBIOS-based transport mechanism and that it is desired to enhance this computer to enable it to carry out DCE RPC functionality without conventional TCP/IP constraints (e.g., inclusion of a dedicated TCP/IP protocol stack, use of TCP/IP protocol sequences on the wire, etc). The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the IBM series of computers is one of the Intel family of microprocessors including the x86 or Pentium microprocessors. However, as noted above, other microprocessors including, but not limited to, Motorola's family of microprocessors such as the 68000, 68020 or the 68030 microprocessors and various RISC microprocessors manufactured by IBM, Hewlett Packard, Sun, Intel, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system (OS) 60 and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. One or more I/O controllers 50, such as a Token Ring Adapter, and Ethernet Adapter, a PC-Net Adapter, and so on, enables communications over the network 56 to other similarly configured data processing systems.

RAM 34 also supports a Network Operating System (NOS) 51 and an associated transport mechanism 53 which together control LAN communications. A protocol stack support routine 55 is also supported for enhancing the number of server sessions that may be supported by the machine, as will be described in more detail below.

Figure 3:
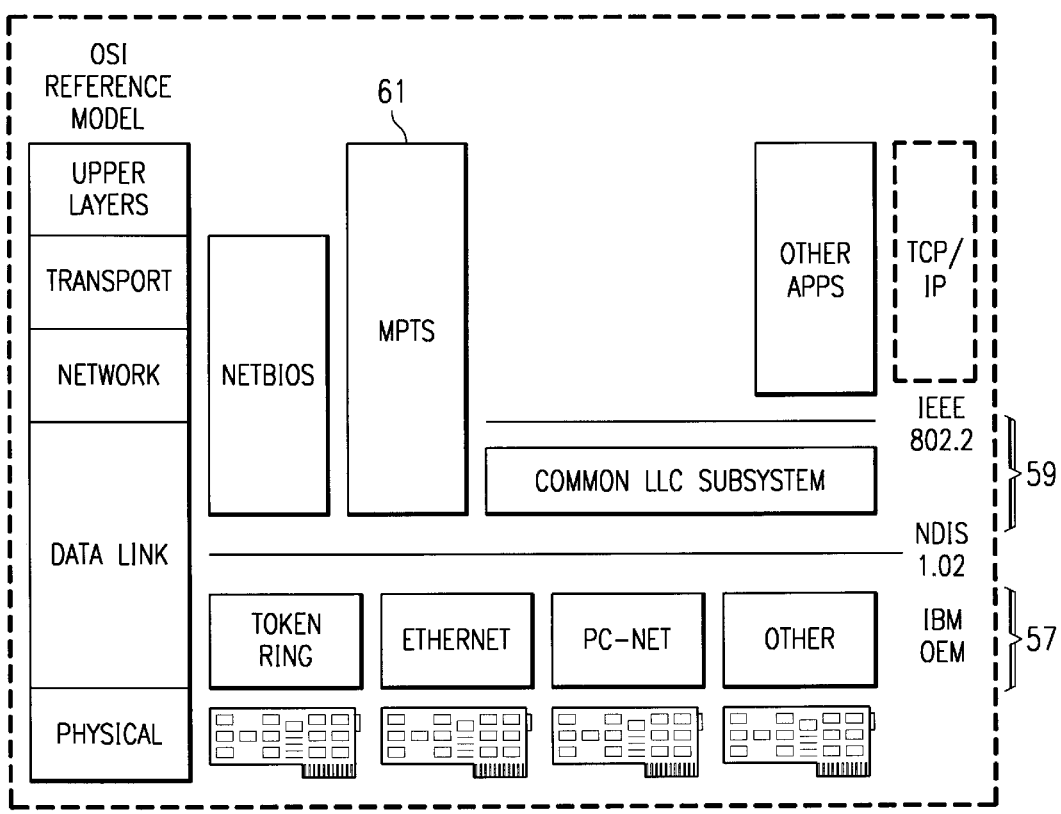
FIG. 3 is a block diagram of a representative LAN Network Operating System (NOS) and transport architecture for the computer of FIG. 2.

FIG. 3 represents a block diagram of the Network Operating System (NOS) and LAN transport mechanism running in the workstation of FIG. 2. The TCP/IP protocol stack is shown in dotted lines because in this invention (as discussed above) the stack is not required (or may not be used if present). Conceptually, all of the components (except the physical cards) are supported in software running in the RAM 34 of the computer. As seen in the left portion of the figure, by convention communication architectures in a local area network are typically characterized as conforming to a seven layer model in the following hierarchy: physical layer, logical or "data" link layer, network layer, transport layer, and the upper layers comprising session layer, presentation layer and application layer. The physical layer comprises the actual physical devices and medium used to transmit information, and it consists of physical adapter cards. The logical or data link layer frames data packets and controls physical layer data flow, insuring delivery of data regardless of the actual physical medium. The network layer addresses and routes data packets. It creates and maintains a route in the network between a source node and a destination node of the network. The transport layer creates a transport pipeline between nodes and manages the network layer connections. The session layer may provide remote procedure call (RPC) support, maintains the integrity of the connection between nodes and controls data exchange. The presentation layer encodes and decodes data and provides transparency between nodes. Finally, the application layer provides the interface to end-user processes and provides standardized services to applications.

The seven layer model has many variations depending on the particular network architecture. The transport mechanism conforms to a Network Driver Interface Specification (NDIS) which provides a standardized medium access control interface for network adapter drivers 57 (identified as Token Ring, Ethernet, PC-Net, etc.) and protocol drivers 59 located within the protocol stacks. NDIS is described in detail in the *LAN Manager Network Driver Interface Specification*, published jointly by 3COM and Microsoft. NDIS has become an industry standard for network adapters and LAN software to communicate with each other. The NDIS layer separates protocol handling from hardware manipulation by defining functions that protocol drivers and network adapter drivers must provide to each other. NDIS defines specifications for network protocol drivers, adapter drivers, an interface between network protocol drivers and adapter drivers and a binding process to link the protocol and adapter drivers. The figure also shows that the mechanism supports the IEEE 802.2 specification, which is described in more detail in International Standard (ISO) 8802-2 (1989).

As also seen in FIG. 3, the transport mechanism includes a Multiprotocol Transport Networking Service (MPTS) 51. Multiprotocol Networking (MPTN) is an IBM architecture accepted by the X/Open Foundation that supports mixed protocol networking. MPTS enables applications programs designed to operate over one transport protocol (e.g., SNA, NETBIOS or TCP/IP) to operate over different transport networks. It is designed to separate the type of addressing and the API used by the application from the protocol used at the transport layer. MPTS is described in U.S. Pat. No. 5,224,098, which is incorporated herein by reference.

Figure 4:
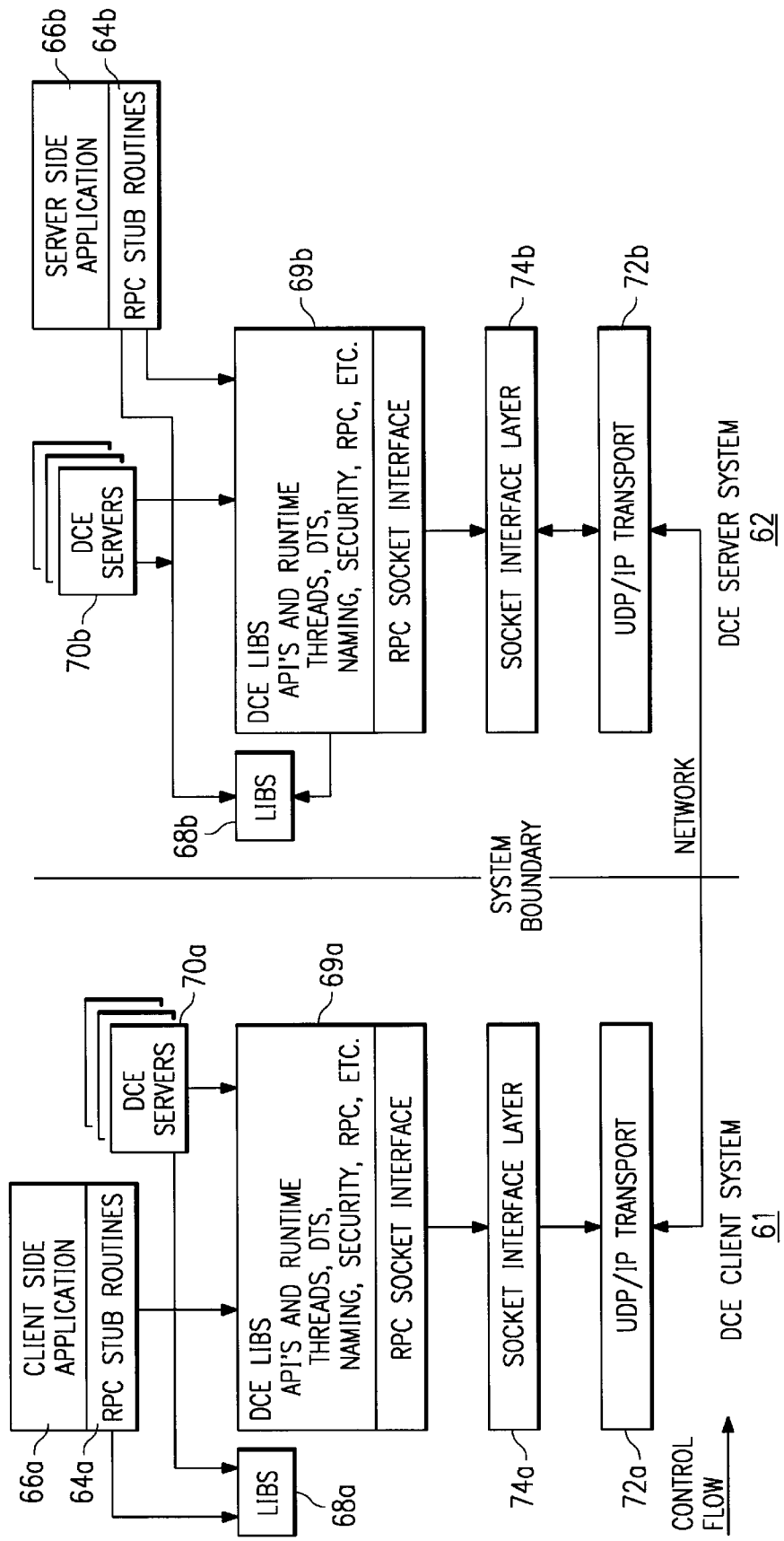
FIG. 4 is a block diagram of a known DCE RPC mechanism in which the present invention is implemented.

The present invention implements native NETBIOS in a known DCE RPC mechanism. By way of brief background, FIG. 4 illustrates the OSF DCE RPC mechanism with the DCE client 61 on one side of the system boundary and the DCE server 62 located on the other side. Client and server stub files 64a and 64b include RPC routines for message handling, including the marshaling and unmarshalling of data into messages that are sent or received. More specifically, the client stub 64a is the code for an RPC interface that is linked with and called by the client application code 66a. In addition to data marshaling, a client stub is used to call the RPC runtime 69a to perform RPC's and, optionally, to manage bindings. The server stub 64b is the calling code for an RPC interface that is linked with server application code 66b containing one or more sets of remote procedures that implement the interface. Both the client and server include operating system libraries (68a and 68b) that contain routines for handling socket calls, file manipulation functions, standard I/O functions, memory management, and exception handling functions. The client and server systems also include a number of DCE servers (70a and 70b) for executing procedures for a user application program. In particular, the client DCE servers 70a normally perform local services for client application programs such as naming or directory services, security services and time services. The DCE servers 70b may perform remote services for client application programs such as print services, file services and the like.

Typically, DCE is layered on top of its local operating system and networking software (not shown). In this example, DCE is layered over a transport level service such as UDP/IP transport service (72a and 72b), which is accessed through a transport interface such as sockets (74a and 74b). The implementation of the DCE system shown is dependent upon the Internet Protocol (IP), socket networking services and operating libraries.

When the DCE client's application code 66a makes a remote procedure call, the code passes input arguments to the stub 64a for the called RPC interface (i.e. the RPC stub routines). The client's stub 64a marshals the input arguments and dispatches the call to the client DCE RPC runtime 69a. The client's DCE RPC runtime transmits the input arguments over the communications network via the socket interface, socket interface layer and UDP/IP transport service) to the server's DCE RPC runtime 69b.

The server's DCE RPC runtime 69b dispatches the call to the server stub 64b for the called RPC interface. The server stub then uses its copy of the RPC interface to unmarshall the input arguments and pass them to the called remote procedure, which is one of the DCE servers 70b. The procedure executes and returns any results to the server's stub 64b, which then marshalls the results and passes them to the server's DCE RPC runtime 69b. The server's RPC runtime transmits the results over the network to the client's DCE RPC runtime 69a, which then dispatches the results to the client's stub 64a. The stub uses its copy of the RPC interface to unmarshall the output arguments and to pass them to the calling application.

In DCE, before any client program can call a server function, it must first establish a binding to the server. This is accomplished by acquiring a binding handle from the DCE RPC runtime component. A binding handle contains information about the communications protocol that a server uses, the address that the server is listening on and, optionally, the endpoint that the server is listening on, and other information (e.g., an RPC protocol version number). A binding handle may be obtained by string binding or from a naming service. String binding is used to convert a string representation of the binding handle to the actual handle; alternatively, a DCE naming service is used to look up servers in the namespace and return appropriate binding handles. The name space is a complete set of Cell Directory Service (CDS) names that one or more servers look up, manage and share. Binding handles returned from the name space usually only contain the network address of the node providing a given service. The network address is an address that identifies a specific host on the network. The actual "endpoint" at that node, which is the address of a specific server instance on the host, is usually not registered in the cell directory service because these entries change frequently. The DCE system supplies a server called rpcd that runs on a well-known port (#135) on every server machine. A server normally binds an endpoint and registers it with the rpcd daemon. When a client detects that it does not have an endpoint to bind to on the remote system, it contacts the endpoint mapper on that node to look up the server's endpoint.

When a server starts up it gets an endpoint assigned to it by calling an RPC__USE__API. Then, the server calls RPC__EP__REGISTER to call the endpoint mapper and list its endpoint in the endpoint map. Next, the server calls RPC__NS__BINDING__EXPORT to put its IP address in the namespace so that its address can be obtained by clients.

Client startup typically involves calling RPC_NS_ IMPORT_BINDING to get a binding from the namespace. This binding contains an IP address but no endpoint. Then, the client calls RPC__EP__RESOLVE__BINDING, which contacts the endpoint mapper at the server machine to get the actual endpoint for the server. The client has a full binding and is then ready to call the server.

If the server has a well-known endpoint, it can export a full binding to the namespace. In this case, the client gets both IP address and port# from the namespace. More typically, the server will export a partial binding to the namespace and register its port# (endpoint) with the endpoint mapper. In this way, the client can get the protocol sequence and the IP address from the namespace, and the port# from the endpoint mapper. If the client knows what machine the server is on, and if it knows what port# the server is using, it does not need to use either the namespace or the endpoint map. This information can be hardcoded in the client, or can be command line parameters that the user supplies when starting the client. The client can create its own binding for the server by creating a string binding from the individual pieces (protocol sequence, host, and port#), and y converting the string binding to a normal binding.

The above background has been provided to provide the context of the present invention in which native NETBIOS is implemented in a known DCE RPC mechanism. The concept of "native" NETBIOS is now explained. In particular, it is known that three (3) components are necessary to uniquely specify a transport mechanism protocol stack: (a) an application programming interface (API), (b) an addressing scheme, and (c) a protocol. The following table sets forth various communication protocols of a known OS/2 architecture:

| API | Addressing | Protocol | Common Name |
|---|---|---|---|
| APPC/CPI-C | SNA | SNA | APPC over LU6.2 |
| APPC/CPI-C | SNA | TCP/IP | APPC over TCP/IP |
| NETBEUI (NCB's) | NETBIOS | NETBIOS | NETBEUI NCBs |
| NETBEUI | NETBIOS | TCP | TCPBEUI |
| NETBEUI | NETBIOS | SNA | NETBEUI over SNA |
| SOCKETS | INET | TCP/IP | native INET Sockets |
| SOCKETS | INET | SNA | (nonnative INET) Sockets over SNA |
| SOCKETS | INET | NETBIOS | (nonnative INET) Sockets over NETBIOS |
| SOCKETS | INET | IPX | (nonnative INET) Sockets over IPX |
| SOCKETS | LIPC | LOCAL IPC | native LIPC (UNIX domain) Sockets |
| SOCKETS | NETBIOS | NETBIOS | native NETBIOS Sockets |

As can be seen, the type of addressing used and the protocol actually used to communicate on the LAN may be different. If the address family is the same as the protocol used, it is referred to as a "native" configuration. If they are different, it is called "non-native." MPTS for OS/2 provides both non-native INET addressing over NETBIOS, as well as native NETBIOS using the sockets API.

According to the present invention, native NETBIOS is implemented in DCE (e.g., OS/2 DCE). Generally, this is achieved as follows. When using native NETBIOS, the application (RPC in this case) continues to use the sockets API (i.e. call such as "socket", "bind" and "connect"). When RPC opens a socket, it tells MPTS 61 (of FIG. 3) it wants the addressing domain to be NETBIOS. When the RPC issues a bind, it then uses a NETBIOS name. When the RPC performs a connect, it includes a NETBIOS socket address with the NETBIOS name of the RPC server to which it desires to connect. The invention provides this NETBIOS name management facility, either by having the names generated by RPC and passed in the bind to MPTS or, preferably, by having MPTS create unique names as a result of a bind call with no name. In addition to this NETBIOS name support, the invention adds connection-oriented and connectionless NETBIOS protocol support (since RPC supports both), and it provides a set of network address family-specific routines for NETBIOS support. These specific features of the inventive scheme can now be discussed.

In NETBIOS, applications are known by NETBIOS names, which are fixed length 16 byte strings, with each application in a machine having a unique name. Also, there is no domain name server in NETBIOS. On each machine, NETBIOS maintains a names table for all applications on that machine. When an application starts, NETBIOS checks to see that that name is not already is use at another machine by broadcasting name queries on the network. If the name is not already in use, it is added to a names table on the local adapter.

To the contrary, with TCP/IP addressing, all application addresses within a machine have a common part (the IP address) and a unique part (the port number), and TCP/IP uses dynamic and well-known endpoints. As previously discussed, a dynamic endpoint means that the bind does not contain a port number, so one must be assigned by MPTS; a well-known endpoint means that the application wants to use a specific port number and thus passes this port number to MPTS in a bind. With NETBIOS, each application's name may be completely different. A NETBIOS bind only binds the NETBIOS socket to one physical adapter while a TCP/IP bind binds the socket to all adapters.

To carry out an RPC, a DCE client needs to know the IP address of the server, the port # of the server, and the protocol to use (udp or tcp protocol sequence). TCP/IP addressing involves a 4 byte IP address and a 2 byte port number. NETBIOS addressing (as noted above) uses a NB name, which is always a 16 byte character string. According to the invention, NETBIOS names are configured to conform to the TCP/IP addressing scheme, i.e. to include a fixed portion, representing the machine on which an application is located, and a changing portion, representing the application on that machine. Preferably, all NETBIOS names are built with the first 12 bytes representing that machine and the last bytes representing a port number. When a server wants a dynamic endpoint, the NETBIOS name is built with the NB hostname and an incrementing port number. The server then exports the hostname into the namespace and registers the port number with rpcd. When the client wants to contact the server, it contacts rpcd using a known name, i.e. the NETBIOS hostname, where the server is located, with a port #135 (the location of the mapper) appended. When a server wants a well-known endpoint, the NETBIOS name is generated by appending the endpoint to the configured NETBIOS hostname.

Although not meant to be limiting, preferably MPTS handles the name generation, with the first 12 bytes filled either with a user-configured ASCII string. The last 4 bytes are filled with an incrementing port #, or a well-known endpoint if it is passed to MPTS.

Thus, according to the preferred embodiment of the invention, one NETBIOS name is assigned to represent a machine, and all NB names used by DCE in this machine are then based off the one name. This name assignment is preferably handled by MPTS graphical user interface (GUI) so that neither user applications nor OS/2 DCE have to do their own name assignments. MPTS handles these names so that DCE can easily divide them into a fixed portion (the machine name), which DCE can use like the former IP address (in TCP/IP), and a changing portion, which DCE can use like the port assignment or endpoint (in TCP/IP). Preferably, the first 12 bytes are fixed and the last 4 bytes vary, although other formats may be used. The 4 byte variable portion lets the port number in ASCII go up to 9999.

When the NETBIOS hostname is configured in MPTS, typically it will be padded on the right with ASCII blanks up to 12. Normally, the name will be formed of ASCII characters and no embedded blanks or backslashes are included. The trailing blanks will be truncated when the hostname is printed in a string binding, and added in when a string binding is converted back to an address in a regular binding. A binary zero in the first byte means that no hostname is present.

The four bytes of the endpoint are also preferably ASCII characters. They are not required to be ASCII numbers, but they typically will be such numbers. When a port# is dynamically assigned (by MPTS or RPC), it will be 4 ASCII digits. If a port# is input from a string binding or a call like rpc_server_use_protseq_ep, it will be truncated on the left if it is longer than 4 characters, and padded on the left with blanks if it is shorter. When converted to a string binding, the blanks on the left will be truncated, and they will be added back in when it is converted to a regular binding. As noted above, preferably no embedded blanks or backslashes are allowed.

Support of native NETBIOS also requires two new protocol sequences, referred to herein as ncacn_nb_stream and ncadg_nb_dgram. These protocol sequences are built using the AP_NETBIOS NETWORK Address Family (NAF) and a socket type of either SOCK_STREAM or SOCK_DGRAM. The socket address uses the data structure sockaddr_nb. The design of the RPC runtime library (reference numeral 69 in FIG. 4) is such that the addition of a new protocol sequence can be accomplished with very little modification to the existing code. This is achieved via two means: (1) modular data structures, and (2) the use of entry point vectors. Modular data structures facilitate the effort of adding a new protocol sequence by providing a consistent mechanism by which to relate the various components that make up the protocol sequence. The majority of the RPC runtime code is common to all protocols, so the use of entry point vectors allows protocol specific routines to be accessed in-line, via an index into an array of functions. The protocol id is used as the index into the entry point vector. The two new protocol sequences require the addition of new routines to handle processing that is specific to that protocol sequence. These routines manipulate NETBIOS addresses in both the 12 byte hostname/4 byte endpoint form, and in the 16 byte NETBIOS name form.

Some RPC API's deal with string bindings, which may be of the form:

objuuid@protocol_sequence:hostname_or_ipaddress [port,options].

For Native NB, string bindings will use this same format, with the NB name split between the hostname and port fields. For example:

ncacn_nb_stream:myhostnamexx [1024]
ncadg_nb_dgram:myhostnamexx [1035].

Binding information in the namespace, as well as in the endpoint map, is kept in a "protocol tower". This is a data structure where each piece of data is known as a floor. For TCP/IP, floors 3, 4, and 5 contain the protocol id, endpoint, and IP address. For NETBIOS, floor 3 contains the protocol id (CO-connection oriented, or CL-connectionless), floor 4 contains the whole 16 byte NB name, and floor 5 is NULL. When the tower is converted to a binding, an 'addr_has_endpoint' flag in the binding is set depending on whether there is a complete NB name or just a partial one. If the last 4 bytes are binary zeros, then the port# has not been set.

Figure 5:
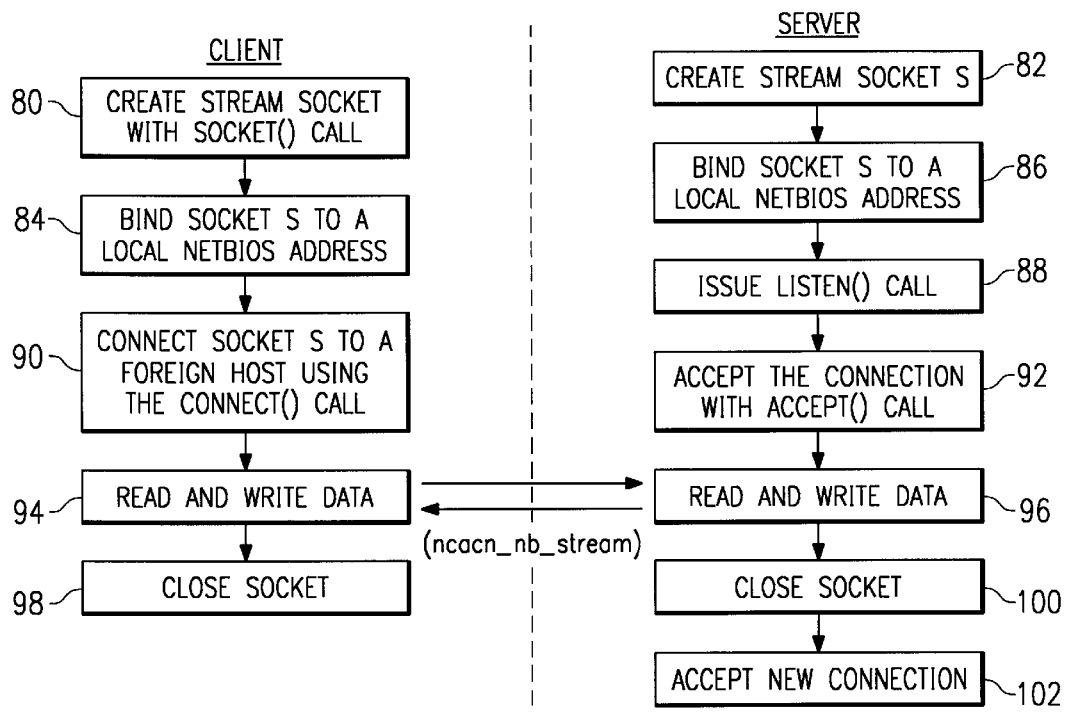
FIG. 5 is a flowchart of a NETBIOS connection-oriented socket session according to the present invention.

FIG. 5 is a flowchart illustrating a NETBIOS connection-oriented socket session implemented according to the teachings of the present invention. This flowchart shows the process flow when the application specifies the ncacn_nb_stream protocol sequence. The various functions of the client are located on the left portion of the chart, and the functions of the server are located on the right portion. At step 80, the client creates a stream socket "s" with the sockets( ) call (which is an RPC API). The server also creates a stream socket "s" with the sockets call. These steps indicate that the client and server are fixing to open up a connection and thus certain data structures must be set up. At step 84 (which is optional) and at step 86, the client (optionally) and server issue a bind call to bind the socket "s" to a local address. According to the present invention, the local address is the name (of the client or server, as the case may be) and is a NETBIOS name, preferably generated by the MTPS as discussed above. At step 88, the server issues a listens( ) call, indicating that it is willing to accept calls. At step 90, it is assumed that the client issues a connect( ) call that seeks to connect socket "s" to a foreign host, which in this case is the server. The connect call specifies the destination address by the NETBIOS name. The variable portion of the name may be obtained through an endpoint mapper if necessary.

At step 92, the server accepts the connection and receives a second socket "ns" by issuing an accept( ) call. At this point the particular session is opened and the RPC may be carried out. For the server, socket s remains available to accept new connections and socket ns is dedicated to the client. At steps 94 and 96, the client reads and writes data on socket s and the server reads and writes data on socket ns, until all data has been exchanged. The read and write operations are carried out using send( ) and receive( ) calls. At step 98, the client closes socket s and ends the session with a soclose( ) call. The server closes socket ns with the soclose( ) call at step 100. The server may then accept another connection from a client or close the original socket s with the soclose( ) call at step 102.

Figure 6:
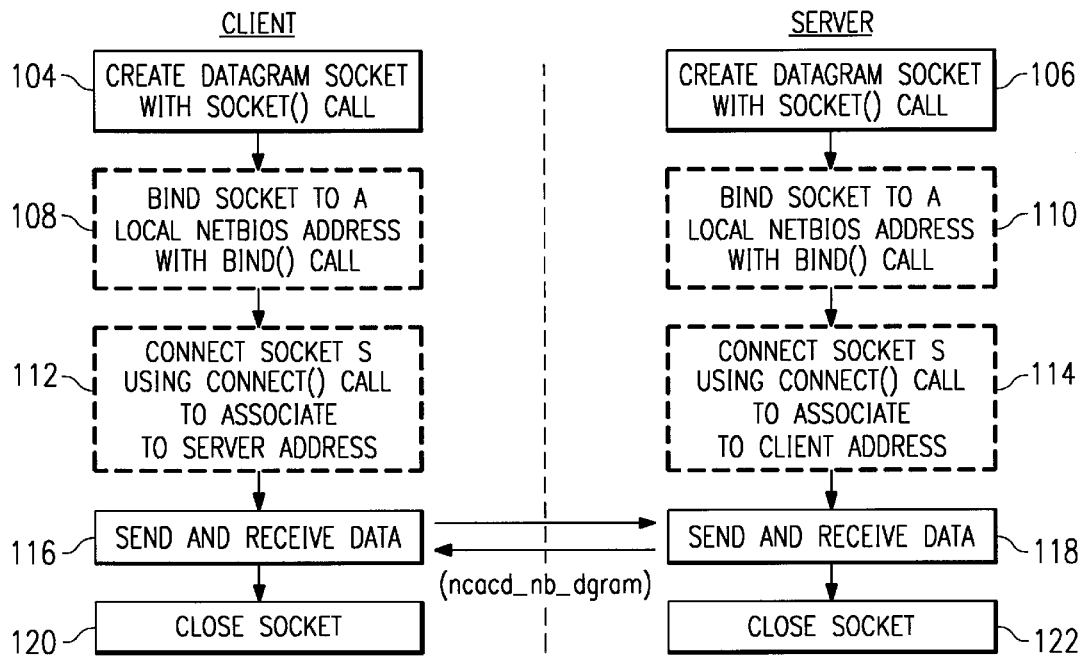
FIG. 6 is a flowchart of a NETBIOS connection-less socket session according to the present invention.

FIG. 6 illustrates a connection-less socket session when the application specifies the ncadg_nb_dgram protocol sequence. At step 104, the client creates a datagram socket s with the socket( ) call. Likewise, the server creates a datagram socket s with the socket( ) call at step 106. The client then (optionally) binds the socket to its local address at step 108, and the server binds the socket to its local address at step 110. As noted above, the local address is a NETBIOS address. At step 112, the client optionally connects socket s to associate the socket with the server address. This is carried out using the connect( ) call. The server optionally associates socket s with the client address using the connect( ) call at step 114. The session is then considered open. At steps 116 and 118, the client and server send and receive data on socket s using send( ) and recv( ) calls (if the connect( ) was called in steps 112 and 114). If steps 112 and 114 were omitted (which is preferred), the client and server use sendto( ) and recvfrom( ) calls (and the binding steps are implemented). At steps 120 and 122, the client and server end the session with an appropriate close socket call.

A detailed functional description of the native NETBIOS design implementation is now provided.

FEATURE—ADD NATIVE NETBIOS TO FULL DCE

1.0 Technical Approach
1.1 Segmenting NETBIOS Names

A preferred solution is to use NB names as though they had a fixed portion representing the machine, and a changing portion representing the application on that machine. Build all NB names with the first 12 bytes representing that machine, and the last 4 bytes representing a port#.

Partial bindings can be supported. When a server wants a dynamic endpoint, the NB name is built with the NB hostname and an incrementing port#. The server can export the hostname into the namespace, and register the port# with RPCD. When the client wants to contact the server it will contact RPCD using a known name, i.e. the NB hostname where the server is located, with a port# of 135 appended.

When a server wants a well-known endpoint, the NB name can be generated by appending the endpoint to the configured NB hostname.

MPTS handles the name generation. The first 12 bytes are filled either with a user-configured ASCII string. The last 4 bytes are filled with an incrementing port#, or a well-known endpoint if it is passed to MPTS.

In this way, dealing with NB addressing information fits in very well with the structure of DCE.

1.2 New Protocol Seauences and the RPC API Calls

To use Native NETBIOS with DCE, two new protocol sequences are defined, ncacn_nb_stream, and ncadg_nb_dgram, for connection-oriented and connectionless NETBIOS protocols. When using the RPC APIs, these new protocol sequences are used just like the previous protocol sequences. When host addresses or endpoints are required, the correct portion of the NETBIOS name is supplied.

Therefore, no changes are required to any of the external RPC APIs. Also, no changes are required to other DCE components in their use of the RPC APIs. However to the extent they use sockets API calls directly, or directly manipulate network addresses, they will be affected.

2.0 External Interfaces

The use of NETBIOS is very similar to the use of IP protocols. Many applications will not have to change at all to use NETBIOS. If MPTS is configured with NETBIOS support, the application will automatically use it when rpc_server_use_all_protseqs is used. However there are differences in some areas. This section will describe what DCE administrators, users, and application writers need to know.

This includes two (2) new protocol sequences, NETBIOS addressing and string bindings, DCE configuration for native NETBIOS, limitations of native NETBIOS, direct use of MPTS socket API calls, MPTS configuration for native NETBIOS, and providing sufficient NETBIOS resources.

2.1 DCE Information
2.1.1 Protocol Seguences

There are 2 new protocol sequences which use the NETBIOS address family. They are:

ncacn_nb_stream ncadc_nb_dgram

These protocol sequences may now be used in the same way that the IP protocol sequences were used before. All APIs which deal with protocol sequences will accept the new NETBIOS protocol sequences. The protocol sequence section of the RPC API chapter in the DCE Application Programmer's Reference may be reviewed for more information. For example, if the application uses the rpc_server_use_all_protseqs API, then NETBIOS will automatically be in the list of protocols registered with the RPC runtime (assuming that NETBIOS is configured in MPTS).

2.1.2 NETBIOS Addressing and String Bindings

NETBIOS addressing differs from IP addressing. However the writer or user of an RPC application usually does not have to be concerned about the sort of addresses that are used by a particular protocol sequence. There are 2 exceptions. During DCE configuration, the user will have to enter addressing information. In addition, some RPC APIs use endpoints (rpc_server_use_protseq_ep), and others manipulate string bindings.

String bindings contain network addresses and endpoints. If the user needs to use or look at string bindings, he or she needs to understand how NETBIOS addresses are used in DCE.

With NETBIOS, applications are known by NETBIOS names. NETBIOS names are fixed length 16 byte strings. Each application in a machine has a unique name.

With NETBIOS sockets, a socket address structure was defined for NETBIOS. Here are the differences between the socket address structures for each address family. The socket address structure for UNIX domain (local) sockets is included for comparison:

struct sockaddr_nb {/* AF_NETBIOS */ short snb_family; /*unique or multicast*/ short snb_tpe; /* netbios netid */ char snb_netid [8]; /* netbios name */ struct sockaddr_in {/* AF_NETBIOS */ short sin_family; /* AF_INET */ u_short sin_port; /* port #*/ struct in_addr sin_addr; /* IP address */

```
char sin_zero [8]; /* reserved */
struct sockaddr_un {/* AF_NETBIOS */
short sun_family; /* AF_UNIX */
char sun_path [108]; /* path name */
```
NOTE: The netid represents the adapter number to be used.

Each adapter has a separate names table. So a NETBIOS bind only binds that socket to one adapter. In TCP/IP, a bind can bind one socket to all adapters (otherwise known as network interfaces).

The NETBIOS protocol itself does not have a concept of a machine name, so each application on the same PC could have a completely different name. However, to make NETBIOS easy to use in the DCE environment, MPTS allows the configuration of a NETBIOS host name (or uses a default for it) when using NETBIOS sockets.

Each 16 byte NETBIOS name is split into a 12 byte host name and a byte port name. All names on the same machine will have the same first 12 bytes. MPTS will fill these 12 bytes with a NB host name.

The host name will be padded with blanks if it is shorter than 12 bytes. MPTS will assign a 4 byte port name, just like the 4 digit port number it assigns for IP addresses. MPTS will only assign numbers, but alpha port names are valid and may be used in user-specified port names, such as when rpc_server_use_protseq_if is used. For ease of use, NETBIOS names are limited to printable ASCII characters and will be uppercased.

Examples of NETBIOS string bindings are:

ncacn_nb_stream:DCESERVER1 [1025]

ncadg_nb_dgram:DCESERVER1 [1044]

You can look at string bindings using DCECP—c endpoint show.

You can look at the actual NETBIOS names with the NETSTAT—S command.

2.1.3 Configuration of DCE

DCE configuration will now allow for NETBIOS protocols to be used and NETBIOS names to be used to specify the security and directory servers.

As well, configuration will prompt for an adapter number (0–3) to be used for all NETBIOS socket communication.

When DCE configuration calls for a NETBIOS name, enter the NETBIOS host name previously configured via MPTS Local adapter number is not needed when using IP addressing. The IP code can RECEIVE from all adapters if all are configured, and the routing table is used to determine on which adapter a SEND should be done. However for NETBIOS, the adapter number must be specified. The local machine's NETBIOS name must be added to the NETBIOS names table, of which there is one per adapter. As well, there is no routing table to be used to determine which adapter should be used on a SEND. Therefore adapter number was added to the socket address structure for NETBIOS. DCE will only use one adapter at a time for Native NETBIOS, and this adapter number may be specified by the user. If no adapter number is specified, the default is adapter 0. The adapter number is stored in a file.

2.1.4 Limitations of Native Netbios

IP can handle user-specified port numbers up to 65535. NETBIOS can only use up to 9999 (limited to 4 places), but port names do not have to be numeric. Any printable ASCII character is allowed, however, some non-alphanumeric characters may cause problems when used in a string binding on a command line due to interpretation by the OS/2 command interpreter. Therefore use of characters other than alphanumeric characters is discouraged.

2.2 MPTS Information

2.2.1 Direct Use of MPTS Socket API Calls

Direct use of MPTS socket API calls may present problems when MPTS is configured for NETBIOS sockets only. MPTS calls are divided between protocol-independent and protocol dependent calls. Calls such as 'gethostbyname' and 'gethostbyaddr' are protocol dependent, and are not available when using Native NETBIOS. Sometimes these calls are used to get the local machine's address. For Native NETBIOS, this can be done by issuing socket, bind, and getsockname.

Code which uses the protocol independent API calls will also have to be changed to use the NETBIOS address family and NETBIOS socket address structure. See the MPTS Programmer's Guide for more information.

2.2.2 Configuration of MPTS

To use Native NETBIOS sockets, MPTS must be configured for NETBIOS socket access. TCP/IP socket access may be configured as well. See the MPTS Configuration Guide for more information.

2.2.3 Providing Sufficient NETBIOS Resources

MPTS configuration allows a number of parameters to be set for NETBIOS. These parameters can be changed using the Edit button on the LAPS configuration panel, or they can be changed directly by editing the NETBEUI_nif section of the IBMCOM\PROTOCOL.INI file. The defaults may suffice, but here are some adjustment details.

2.2.4 Sessions, Commands, and Names

The following 3 parameters contain the 3 basic resources that the NETBEUI device driver must have to provide NETBIOS communications services to applications.

SESSIONS=40

NCBS=85

NAMES=21

NAMES refers to the number of NETBIOS names which may be used. NCBs refers to the number of NETBIOS control blocks which may be used. The NETBIOS sockets device driver uses NCBs as the interface to the NETBIOS device driver. SESSIONS refers to the number of connection-oriented communications sessions which may be active at one time.

In CONFIG.SYS there are two device drivers, NETBEUI.OS2 and NETBIOS.OS2. NETBEUI owns these resources, and they are defined in the NETBEUI section in PROTOCOL.INI. The statements above show the defaults.

These resources are shared by Lan Requester and by NETBIOS.OS2. Lan Requester does not use NETBIOS.OS2 but instead interfaces directly with NETBEUI.OS2. Almost all other NETBIOS applications use NETBIOS.OS2, including MPTS NETBIOS sockets (NB.SYS).

When CONFIG.SYS is processed and Lan Requester is loaded (when NETWKSTA.200 is loaded), it requests the amount of resources specified in IBMLAN.INI. Then when NETBIOS.OS2 is loaded, it will get whatever resources are left. This can be seen in the following 3 statements in \IBMCOM\LANTRAN.LOG. (LANTRAN.LOG is where all activity concerning LAPS and MPTS device drivers is logged).

IBM OS/2 NETBIOS 4.0

Adapter 0 has 140 NCBs, 140 sessions, and 32 names available to NETBIOS applications NETBIOS 4.0 is loaded and operational So MPTS (and other users of NETBIOS) can only get whatever is left after Lan Requester has loaded.

When MPTS NETBIOS sockets (AFNB.SYS) is loaded, it does not make a request of resources from NETBIO- S.OS2. However when the first NETBIOS sockets application starts (issues a BIND request), AFNB.SYS will ask NETBIOS.OS2 for resources, and will append the following line in IBMCOM\LANTRAN.LOG so that the user will know what resources were allocated to it.

NetBIOS PMM: Using Adapter 0 with 20 NCBs, 20 sessions, and 8 names.

MPTS by default will only reserve 8 NAMES, 20 NCBS, AND 20 SESSIONS for NETBIOS sockets users. This limits RPC to only 8 names. The resources available for NETBIOS sockets users like RPC can be increased by configuring via MPTS panels, which will result in changes to CONFIG.SYS as follows:

DEVICE=C:\MPTN\PROTOCOL\AFNB.SYS/C:80/S:80/IN:60

To increase the amount of resources available to NB.SYS, increase the parameters in PROTOCOL.INI accordingly.

2.2.5 Detecting Failures Due to Insufficient NETBIOS Resources

NETSTAT -S can be run to see how many NETBIOS sockets (and NETBIOS names) currently used. If NETBIOS names run out, an RPC return code of 0x 16c9a003 (382312451) rpc_s_cant_bind_socket is provided.

It is not as easy to discern when NB.SYS runs out of NetBIOS sessions or commands. Sometimes the device driver cannot report the error in a return code to a socket API call, which in turn would be reported with an RPC return code. In this case, NB.SYS will report the error in the LANTRAN.LOG file, found in the IBMCOM subdirectory. This log file should be checked when having problems with NETBIOS.

2.3 Chanaes Recuired to run in a NETBIOS only environment

Some DCE applications will work without modification in a NETBIOS only environment. Others will not. The most common problem has been the use of gethostname or gethostbyname. This section will discuss changes that may be required to some applications to get them to run successfully.

2.3.1 Hardcoded Protocol Sequences

Some DCE applications may have hardcoded IP protocol sequences. Naturally these applications will not work in a NETBIOS only environment. These must be changed to use all or one of the supported protocol sequences, or to allow a protocol sequence to be passed in as a parameter. Applications which have hardcoded protocol sequences and endpoints coded in their .IDL file for use with rpc_server_use_all_protseqs_if will need to add endpoints for NETBIOS.

Scan for any of the protocol sequence strings.

2.3.2 String Bindings and Hostnames

DCE applications which build their own string bindings using rpc_string_binding_compose have to get the host network address to use as input to the call. These applications frequently use gethostname( ) or getenv( ) to get the HOSTNAME environment variable. There is no HOSTNAME environment variable in a NETBIOS only environment. It is also possible some applications could be using dce_of_get_host_name to get a name to use in a string binding. This call works in a NETBIOS environment, but this returns the DCE host name, which may not be the same as either the IP hostname or NETBIOS hostname. See below for a discussion on how to get the NETBIOS hostname.

2.3.3 Protocol Dependent MPTS Socket API Calls

A group of MPTS socket API calls are identified as being protocol dependent. This means that they are associated with the use of IP addresses and may not work in a NETBIOS only environment. Some calls addresses and may not work in a NETBIOS only environment. Some calls only use code in TCP32DLL.DLL and do not require the AFINET.SYS device driver, and may still work. An example is ntohl ( ). However other API calls will not work, and the most frequent example is gethostbyname( ). This call is frequently found in applications that assume a TCP/IP environment.

Gethostbyname/gethostbyaddr may be used to get an IP hostname to use in a string binding, to use directly in a connect API call, or to use to compare with a host address that has been obtained elsewhere. This call fails in a NETBIOS only environment. If a hostname is required, the NETBIOS hostname may be substituted.

Check the .MAP file from the linker to see what protocol dependent socket calls are being used. Look for references to tcp32dll.

2.3.4 Protocol Independent MPTS Socket API Calls

A second group of MPTS socket API calls are identified as being protocol independent. These calls are supported in a NETBIOS only environment. However, the parameters to the calls will typically have to change. Examples are socket, bind, connect, send, receive. These calls will only work if changed to use the NETBIOS address family (AF_NB) and the NETBIOS socket address structure. As well as calls such as ioctl are in the protocol independent group because they can be used for both AF_INET on TCPIP and AF_INET on NETBIOS (non-active). However ioctl is not supported for AF_NB.

2.3.5 Obtaining the NETBIOS Hostname from MPTS

To obtain the NETBIOS hostname, open a NETBIOS socket with the socket( ) call, bind it with the bind( ) call, and then use getsockname( ) to get the socket address structure. The NETBIOS hostname will be in the first 12 bytes of the NETBIOS name.

2.3.6 Obtaining the NETBIOS Hostname from RPC

An API is being added to RPC specifically to aid other DCE components who require knowledge of the NETBIOS host name, in particular the security component, and perhaps configuration. This API is being defined generally enough so that it can be used to get either a list of local IP addresses or local NETBIOS addresses (currently there can only be one). The API will return a new structure called a netaddr_vector, so a second API is being defined to free the netaddr_vector. The API is being defined as follows:

```
void rpc_network_in8_local_netaddrs (protseq, netaddr_vector,
status)
unsigned_char_t            _*protseq;
rpc_netaddr_vector_t            **netadr_vector
unsigned32                 _*status;
void rpc_netaddr_vector_free (netaddr_vector, status)
rpc_netaddr_vector_t            **netaddr_vector
unsigned32                 _*status;
typedef struct
{
    unsigned32             _len;
    unsigned_char_t        *netaddr[1];
{ rpc_netaddr_vector_t,    *rpc_netaddr_vector_p_t;
```

Input is a protocol sequence string. It is used to specify which address family is being inquired about. No check is made to see if this particular protocol sequence is actually supported. That should be determined via rpc_network_inq_supported_protseqs. Output is a vector of either IP addresses in string form, or a NETBIOS hostname.

3.0 Internal Design Description

The majority of the changes to DCE to implement Native NETBIOS are confined to the RPC component. However there are changes to security, directory, DCED, and install/config as well.

3.1 RPC Changes

The RPC runtime is designed with provision for the addition of new protocol sequences. Most of the code is address family independent. The functions which are dependent on the address family are kept separate, and are called indirectly via a vector of function pointers known as an entry point vector. Each address family has a set of similar routines. When the common code needs to call a function that is address family dependent, it calls a common function which redirects the calls to the function for the current address family via the entry point vector. The protocol id is used as the index into the entry point vector. New protocol sequences require the addition of new routines to handle processing that is specific to that protocol sequence.

3.1.1 Adding NETBIOS to RPC Runtime (1) Define the rpc_addr structure for NB to use the NB address structure sockaddr_nb. Create nbnaf.h.

(2) Add 2 protocol sequence strings for NB. Add 2 protocol sequence Ids to go with these protocol sequences. Add these to com.h (3) Add a NAF id for NB (17). This number was picked by MPTS. Add to com.h. See mptn\include\sys\socket.h.

(4) Add 2 entries to the protocol sequence ID table as follows:

| | |
|---|---|
| rpc_protseq._id | one of the protseq ids we just defined |
| rpc_protocol_id | either ncacn or ncadg |
| naf_id | the Naf id we just defined. (1st parm in socket call) |
| net_protocol_id | protocol_id_uns (unspecified) (3rd parm in socket call) this is left unspecified since there is only one protocol (NETBIOS) associated with the NETBIOS NAF. |
| net_if_id | the socket type, stream or dgram. (2nd parm in socket call) |
| rpc_protseq | protocol sequence string matching the protseq id. |

The protocol sequence ID table is in comp.c.

(5) Add entry 17 to the NAF ID table for NB. This is in comp.c.

(6) Add declaration of rpc_nb_init to comnaf.h. This routine fills in the NAF function epv and is the only one which is referenced by name.

(7) Create the set of Network Address Family specific routines which must be defined for each NAF. The epv (vector of pointers) to these routines contains 24 function pointers. Create nbnaf.c (copy from ipnaf.c) for these routines. There are 22 routines here. The other 2 (desc_inq_addr and get_broadcast) will be in nbnaf_sys.c. inq_max_frag_size also requires the addition of rpc_b_init_local_$_{addr}$_vec and rpc_$_{nb}$_is_local_addr to nbaf_sys.c.

Add special handling for the adapter # to rpc_nb_init.

(8) Create desc_inq_addr and get_broadcast, the last 2 routines in the NAF epv. They go in os22.0/nbnaf_sys.c (9) Create twr_nb_lower_flrs_from_sa and twr_nb_$_{lower}$_flrs_to.sa. These routines are called by tower_flrs_from_addr and tower_flrs_to_addr in the NAF epv. Create twr_nb.c for these functions.

(10) Add the new protocol towers to the rpc_tower_prot_id table in comtwrref.c.

(11) Add the NETBIOS protocol sequences to ep.idl so RPCD will support NETBIOS.

(12) Fix protocol dependent stuff in dgsoc.c and dg.h

(13) Fix protocol dependent stuff_- DG call forwarding has an IP sockaddr hardcoded as part of the forwarded packet. Change this packet in dg.h to allow space for a NB sockaddr. Change dglsn.c and dgslsn.c to fix a compile problem with the new structure.

(14) Disable broadcast calls for NETBIOS in dgccall.c since current code won't work with NETBIOS.

(15) Change runtime.lite makefile to support NETBIOS.

(16) Add new API rpc_network_inq_local_netaddrs to ?.c.

3.1.2 Added/Changed Functions

| | |
|---|---|
| nbnaf.c | rpc_nb_init |
| | addr_alloc |
| | addr_copy |
| | addr_set_endpoint |
| | addr_ing_endpoint |
| | addr_set_netaddr |
| | addr_ing_netaddr |
| | ing_max_tsdu |
| | addr_compare |
| | ing_max_pth_unfrag_tpdu |
| | ing_max_loc_unfrag_tpdu |
| | desc_ing_network |
| | set_pkt_nodelay (changed to no-op) |
| | tower_flrs_from_addr |
| | tower_flors_to_addr |
| | desc_ing_peer_addr |
| | set_port_restriction (changed to no-op) |
| | get_next_restricted_port (changed to no-op) |
| | ing_max_frag_size |
| nbnaf_sys.c | desc_ing_addr |
| | get_broadcast |
| | rpc_nb_init_local_addr_vec |
| | rpc_nb_is_local_addr |
| twr_nb.c | twr_nb_lower_flrs_from_sa |
| | twr_nb_lower_flrs_to_sa |
| dgsoc.c | make code protocol independent |
| dgccall.c | disable datagram broadcast calls |
| dglsn.c | use bcopy with new forwarded packet |
| dgslsn.c | use bcopy with new forwarded packet |

3.1.3 Added/Changed Data

| | |
|---|---|
| nbnaf.h | rpc_nb_addr_t |
| | rpc_c_nb_dgram_max_loc_unfrg_tpdu 4088 |
| | rpc_c_nb_dgram_max_pth_unfrg_tpdu 4088 |
| | rpc_c_nb_dgram_max_tsdu 4088 |
| com.h | rpc_c_naf_id_nb 17 |
| | rpc_c_protseg_id_ncacn_nb_stream |
| | rpc_c_protseg_id_ncadg_nb_dgram |
| | rpc_protseg_ncacn_nb_stream "ncacn_nb_stream" |
| | rpc_protseg_ncacn_nb_dgram "ncadg_nb_dgram" |
| comnaf.h | add declaration of rpc_nb_init |
| dg.h | make code protocol independent |
| twrp.h | add protocol id for use in NETBIOS tower |
| comp.c | add 2 entries to protocol sequence ID table |
| " | add 1 entry to the NAF ID table |
| comtwrref.c | add 2 entries to the rpc_tower_prot_ids table |
| ep.idl | add endpoints for NETBIOS protocol sequences to RPCD ifspec |
| makefile.mk | change runtime.lite makefile to add NETBIOS |

3.2 Security Changes

Security requires several changes. Security client code uses gethostbyname to get the local host addresses and then sends this list in a message to the security server, where the list is used to compare against he address obtaining from the client binding. This is one of the primary motivations for the new RPC API.

The kerberos code within security has many protocol independent socket calls to send and receive data. This code is only used to contact the security server when RPC fails. This code is not being converted to use NETBIOS sockets. However, a check is being made to ensure that the failure of the AF_INET socket calls in the NETBIOS only environment is being handled correctly.

3.3 Directory Changes

Directory uses one gethostname( ) call, which must be changed.

3.4 DCED Changes

The endpoint mapper (formerly RPCD and now integrated into DCED) uses well_-known endpoints, so DCED need to add endpoints for the NETBIOS protocol sequences. The changes to ep.idl in RPC are used by DCED.

3.5 Install/Config Changes

Install/config also needs to be changed to allow for input of NETBIOS host names, specification of the use of NETBIOS protocols, and input of an adapter number to use with those protocols.

4.0 Using Specific Protocol Sequences

OS/2 DCE supports 4 protocol sequences.

ncacn_ip_tcp
ncadg_ip_udp
ncacn_unix_stream
ncacn_nb_stream
ncadg_nb_dgram

The protocol sequences that an RPC server supports depends on what protocol sequences the server requests via the "use_protseq" APIs. This list of protocol sequences is limited by what is supported by the RPC runtime in the session where the server is started. As well, the protocols supported by the RPC runtime are limited by the protocols that are supported by the current MPTS configuration.

The protocol sequence actually used when an RPC client calls a server must therefore be one that is supported both by the RPC server, and by the RPC runtime in the session where the RPC client is started.

4.1 The RPC SUPPORTED PROTSEQS Environment Variable

The RPC_SUPPORTED_PROTSEQS environment variable is used to tell the RPC runtime to limit the set of supported protocol sequences to those specified by this environment variable. The syntax is to list the desired protocol sequence strings, separated by colons (not semicolons).

SET RPC_SUPPORTED_PROTSEQS=ncacn_ip_tcp:ncadg_ip_udp

Like any other OS/2 environment variable, it can be set in CONFIG.SYS where it will be in effect in all sessions, or it can be set individually in any session.

Even if only TCPIP and not NETBIOS is being used, this environment variable need not be set, but MPTS must be configured for TCPIP and not NETBIOS (or vice versa).

In general, this environment variable is used to test certain protocol sequences in certain sessions. It is not required when supporting all protocol sequences, or when all sessions will support the same protocol sequence or sequences, since this can be limited by MPTS.

Although the user can override this by resetting the RPC_SUPPORTED_PROTSEQS environment variable in any session, resetting the environment variable is not recommended.

4.2 HOW RPC PROTOCOL SUPPORT WORKS

For the RPC runtime to support (allow use of) a particular protocol sequence, two things must be true:

1) The use of the protocol sequence must be allowed, either by not setting the RPC_SUPPORTED_PROTSEQS environment variable (the default is all protseqs), or by setting it to the desired protocol sequence.
2) The underlying transport software (MPTS for OS/2) must support and be configured for the desired protocol sequence.

When the first call to RPC runtime is made, RPC initialization is performed, RPC has a list of all possible protocol sequences. RPC will first check to see if the RPC_SUPPORTED_PROTSEQS environment variable is set. It will go through the list and set the "supported" flag for each protocol sequence the user has allowed. The default (when the environment variable is not set) is to support all protseqs.

Next RPC initialization will try to open a socket for each type, to see if the underlying transport supports the protseq.

Only those protseqs which were successful are left in the list as supported.

This means the set of supported protseqs can be restricted either by setting the environment variable, or by changing the MPTS configuration.

Of course, even if all protocol sequences are supported by the RPC runtime, the RPC server can choose to use particular protocol sequences through the use of the rpc_server_use_protseq API.

5.0 Additional Design Notes

This section discusses what MPTS should do when BIND is called for the NB address family but no NB name is passed in. This featurs provides the following functionality:

(1) have the MPTS GUI prompt for a NB hostname when native NB is configured
(2) do name generation for explicit BINDS as well as implicit BINDS (when no NB name is specified),
(3) change the name generation to a 12 byte host name appended with a 4 byte incrementing number,
(4) add an option where the first part (12 bytes) of the host name is filled in by MPTS but the last 4 bytes are passed by the user.

The machine name can be up to 12 bytes long. If it is shorter, it will be padded with blanks. If it is longer, it will be truncated to 12 bytes, so the result will always be a fixed 12 byte name.

The MPTS GUI may bring up a panel to input this name when Native NB is configured. The MPTS GUI brings up a panel to input this information to build the MPTPADDR command when non-native NB is configured.

Change the BIND call for NB so that MPTS will build a NB name using the configured hostname and the snb_name passed as a parameter to BIND. The name generation would be as follows:

snb_name is the 16 byte name field in the sockaddr structure for Netbios
NBNAME is the resulting Netbios Name
PORT# starts at 1024
PORTASCII=PORT# converted to ASCII
If 1st 12 bytes of snb_name=0 (binary) then
NBNAME=12 byte hostname concatenated with 4 byte PORTASCII Increment PORT# AND PORTASCII Else (last 4 bytes not 0) (well-known endpoint)
    NBNAME=12 byte hostname concatenated with last 4 bytes of snb_name
Else
    NBNAME=snb_name

EXAMPLES

If snb_name= "000000000000000000000000000000000"x then (all 0s; dynamic endpoint)
    NBNAME="mymachine1 1024" (ascii)
If snb_name="00000000000000000000202032303031"x then (1st 12 bytes are 0s, but last 4 are not;well-known endpoint
    NBNAME="mymachine1 2001" (ascii)
If snb_name–"41414141414141414141414141414242"x then 91st 12 bytes are not 0)
    NBNAME="AAAAAAAAAAAAAABB" (ascii)

MPTS will build the name with the first 12 bytes being the hostname provided with the command. Starting at 1024 corresponds with the fact that the 0-1023 port range is reserved for well-known ports in TCPIP. The same name generation would be done for connects which cause an implicit bind, or any other case where a name must be generated.

One of the preferred implementations of the invention is as a set of instructions in a code module resident in the random access memory of the endpoint. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the inventive naming conversion techniques should be useful in any network environment.

Having thus described my invention, what I claim as new and desire to secure by letters patent is set forth in the following claims:

What is claimed is:

1. In a distributed computing environment wherein client machines issue remote procedure calls (RPC's) to server machines over a network using a transport mechanism specified by an application programming interface (API), a first addressing scheme and a first protocol, a method comprising the steps of:
    configuring a hostname to represent each server machine in the network that supports applications associated with a second protocol;
    assigning the hostname to a first fixed portion of an application address;
    in response to an RPC issued by a client machine, obtaining an application address from the set of application addresses; and
    using the application programming interface of the transport mechanism and the second protocol to execute the RPC to a server machine identified by the application address.

2. The method as described in claim 1 wherein the step of generating a set of application addresses includes the steps of:
    configuring a hostname to represent each server machine in the network that supports applications associated with the second protocol; and
    assigning the hostname to a first fixed portion of an application address.

3. The method as described in claim 1 wherein an application address has a second variable portion.

4. The method as described in claim 3 wherein the step of generating a set of application addresses also includes the step of:
    generating a port number for each application associated with the second protocol supported on the server machine.

5. The method as described in claim 4 wherein the port number is generated on an as-needed basis.

6. The method as described in claim 2 wherein the hostname is configured using a multiprotocol transport service interface.

7. The method as described in claim 1 wherein the API of the transport mechanism is sockets and the first protocol is TCP/IP.

8. The method as described in claim 7 wherein the second protocol is NETBIOS.

9. The method as described in claim 8 wherein the RPC is executed using a NETBIOS connection-oriented protocol sequence.

10. The method as described in claim 8 wherein the RPC is executed using a NETBIOS connection-less protocol sequence.

11. In a distributed computing environment wherein client machines normally execute remote procedure calls (RPC's) to server machines over a network using a TCP/IP transport mechanism specified by a sockets application programming interface (API), a TCP/IP addressing scheme and the TCP/IP protocol, the improvement comprising:
    means for configuring a NETBIOS hostname to represent each server machine in the network that supports NETBIOS applications;
    means for assigning the NETBIOS hostname to a first fixed portion of an application address; and
    means responsive to the configuring and assigning means for executing remote procedure calls using the sockets API and the NETBIOS.

12. In the distributed computing environment as described in claim 11 wherein the mapping means includes:
    means for configuring a NETBIOS hostname to represent each server machine in the network that suppports NETBOIS applications; and
    means for assigning the NETBIOS hostname to a first fixed portion of an application address.

13. In the distributed computing environment as describe in claim 11 wherein the mapping means further includes:
    means for generating a port number for each NETBIOS application supported on the server machine; and
    means for assigning the port number to a second variable portion of the application address.

14. In the distributed computing environment as described in claim 13 wherein the fixed first portion of the application address is 12 bytes and the second variable portion of the application address is 4 bytes.

15. In the distributed computing environment as described in claim 13 Wherein the means for generating a port number is a multiprotocol networking service.

16. A computer connectable into a distributed computing environment wherein client machines normally execute remote procedure calls (RPC's) to server machines over a network using a TCP/IP transport mechanism specified by a sockets application programming interface (API), a TCP/IP addressing scheme and the TCP/IP protocol, comprising:

a processor;

an operating system; and a multiprotocol transport service (MPTS); and

NETBIOS protocol support means for configuring and managing NETBIOS application addresses to enable execution of RPC's using the sockets API and the NETBIOS protocol.

17. The computer as described in claim 16 wherein the NETBIOS protocol support means includes:

means for configuring a NETBIOS hostname to represent each server machine in the network that supports NETBIOS applications; and means for assigning the NETBIOS hostname to a first fixed portion of an application address.

18. The computer as described in claim 17 wherein the NETBIOS protocol support means further includes:

means for generating a port number for each NETBIOS application supported on the server machine; and means for assigning the port number to a second variable portion of the application address.

19. The computer as described in claim 16 wherein the multiprotocol network transport service (MPTS) includes means for automatically generating NETBIOS names.

20. A computer program product for use in a computer having a processor, a memory and means for connecting the computer into a distributed computing environment wherein client machines normally execute remote procedure calls (RPC's) to server machines over a network using a TCP/IP transport mechanism specified by a sockets application programming interface (API), a TCP/IP addressing scheme and the TCP/IP protocol, the computer program product comprising:

means for configuring NETBIOS application names to conform to the TCP/IP addressing scheme; and means responsive to the configuring means for executing remote procedure calls using the sockets API and the NETBIOS protocol.

* * * * *

UNITED STATES PATENT AND TRADEMARK OFFICE
CERTIFICATE OF CORRECTION

PATENT NO. : 6,366,958 B1
DATED : April 2, 2002
INVENTOR(S) : Ainsworth et al.

It is certified that error appears in the above-identified patent and that said Letters Patent is hereby corrected as shown below:

Column 21,
Lines 60-64, cancel "configuring a hostname to represent each server machine in the network that supports applications associated with a second protocol; assigning the hostname to a first fixed portion of an application address;" and insert therefor
-- generating a set of application addresses in accordance with a second addressing scheme associated with a second protocol; --.

Column 22,
Line 13, "claim 1" should read -- claim 2 --.
Lines 44-51, cancel "means for configuring a NETBIOS hostname to represent each server machine in the network that supports NETBIOS applications; means for assigning the NETBIOS hostname to a first fixed portion of an application address; and means responsive to the configuring and assigning means for executing remote procedure calls using the sockets API and the NETBIOS" and insert therefor
-- means for mapping NETBIOS application names to conform to the TCP/IP addressing scheme; and means responsive to the mapping means for executing remote procedure calls using the sockets API and the NETBIOS protocol --.
Line 56, "NETBOIS" should read -- NETBIOS --.
Line 60, "claim 11" should read -- claim 12 --.

Signed and Sealed this

Twenty-fourth Day of December, 2002

JAMES E. ROGAN
*Director of the United States Patent and Trademark Office*